United States Patent [19]
Nakano

[11] Patent Number: 5,831,754
[45] Date of Patent: Nov. 3, 1998

[54] OPTICAL AMPLIFIER

[75] Inventor: Hiroyuki Nakano, Yokohama, Japan

[73] Assignee: Hitachi, Ltd., Tokyo, Japan

[21] Appl. No.: 432,074

[22] Filed: May 1, 1995

[30] Foreign Application Priority Data

May 6, 1994 [JP] Japan ................................ 6-094136

[51] Int. Cl.$^6$ ............................ H04B 10/00; H04J 14/02; H01S 3/00
[52] U.S. Cl. ...................... 359/161; 359/134; 359/160; 359/179; 359/127; 359/341; 372/6
[58] Field of Search .................. 359/127, 134, 359/160–161, 179, 188, 195, 341; 372/6

[56] References Cited

U.S. PATENT DOCUMENTS

| | | | |
|---|---|---|---|
| 5,050,949 | 9/1991 | DiGiovanni et al. | 359/341 |
| 5,375,010 | 12/1994 | Zervas et al. | 359/341 |
| 5,392,153 | 2/1995 | Delavaux | 359/341 |
| 5,406,404 | 4/1995 | DiGiovanni et al. | 359/134 |
| 5,452,116 | 9/1995 | Kirkley et al. | 359/134 |
| 5,500,756 | 3/1996 | Tsushima et al. | 359/160 |
| 5,563,733 | 10/1996 | Mitsuda et al. | 359/134 |
| 5,579,153 | 11/1996 | Laming et al. | 359/341 |

FOREIGN PATENT DOCUMENTS

| | | | |
|---|---|---|---|
| 0650161 | 3/1993 | Australia | 359/161 |
| 0590633 | 4/1994 | European Pat. Off. | 359/161 |

OTHER PUBLICATIONS

"Analysis of Optical Gain Enhanced Erbium–Doped Fiber Amplifiers Using Optical Filters", A. Yu, et al, IEEE Photonics Technology Letters, vol. 5, No. 7, Jul. 1993, pp. 773–775.

"Dispersion Compensating Fibre with a High Figure of Merit of 250ps/nm/dB", M. Onishi et al, Electronics Letters, Jan. 20, 1994, vol. 30, No. 2, pp. 161–163.

*Primary Examiner*—Kinfe-Michael Negash
*Attorney, Agent, or Firm*—Antonelli, Terry, Stout & Kraus, LLP

[57] ABSTRACT

An optical amplifier includes a first multiplexing/demultiplexing unit for multiplexing or demultiplexing a signal light and a pumping light, a first optical amplifying medium coupled to the first multiplexing/demultiplexing unit for amplifying the signal light, a second multiplexing/demultiplexing unit coupled to the first optical amplifying medium for multiplexing or demultiplexing the signal light and the pumping light, a light signal characteristic compensation unit coupled to the second multiplexing/demultiplexing unit for compensating a characteristic of the signal light, and a second optical amplifying medium coupled to the second multiplexing/demultiplexing unit for amplifying the signal light.

18 Claims, 9 Drawing Sheets

OPTICAL AMPLIFIER

BACKGROUND OF THE INVENTION

The present invention relates to an optical amplifier applied to an optical transmission apparatus such as an optical transmitter/receiver apparatus or an optical repeater in an optical communication system.

In the prior art, a dispersion compensating fiber is used in an optical receiver or an optical transmitter in order to suppress a waveform distortion of an optical signal due to a waveform dispersion of a transmission line fiber, but because of its large loss, it is essential to use it with an optical amplifier for compensating the loss. This technique is disclosed in OSA Optical Fiber Communication Conference, 1992, pp. 367–370.

Figure 14:
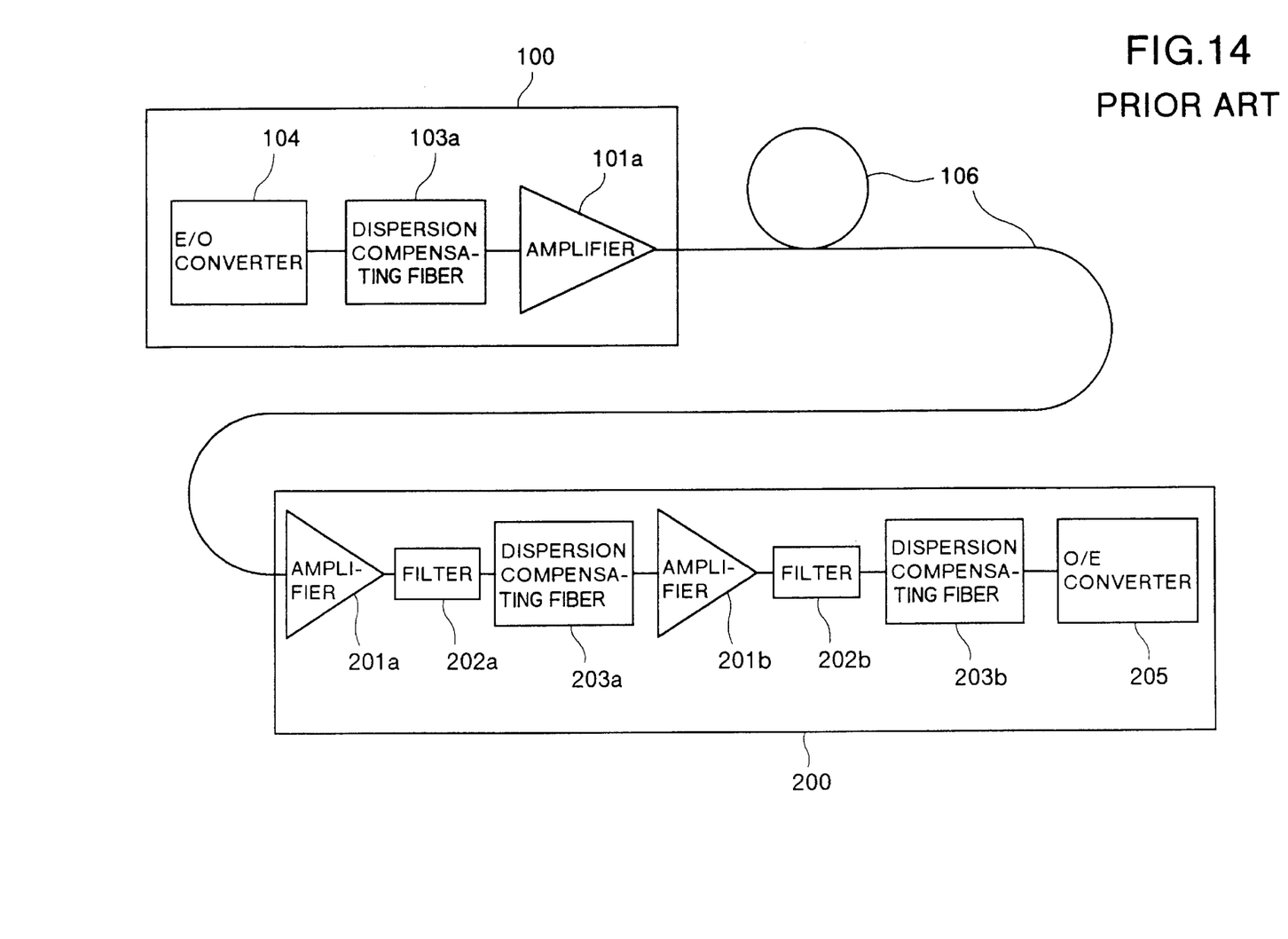
FIG. 14 shows a configuration of a prior art optical transmission system using a dispersion compensating optical fiber in an optical transmitter/receiver.

FIG. 14 shows a configuration of an optical fiber transmission system which uses a prior art dispersion compensating optical transmitter 100 and a prior art dispersion compensating optical receiver 200. The optical transmitter 100 comprises an erbium doped optical fiber amplifier 101a, a dispersion compensating fiber 103a and an electro-optical converter 104. The optical receiver 200 comprises erbium doped optical fiber amplifiers 201a and 201b, optical bandpass filters 202a and 202b, dispersion compensating fibers 203a and 203b and a photo-electric converter 205. Losses of the dispersion compensating fibers used are 3.1 dB, 10.6 dB and 5.3 dB, respectively for a light signal level. In order to compensate for the losses, a total of three erbium doped optical fibers are used, which amplify the signal lights by using separate pumping light sources. A characteristic of the optical fiber amplifier when the dispersion compensating fiber is added is that a noise figure is increased by a loss when the dispersion compensating fiber is arranged in a preceding stage, and a light output is decreased by the loss when the dispersion compensating fiber is arranged in a succeeding stage.

In the known dispersion compensating optical transmitter and dispersion compensating optical receiver shown in FIG. 14, the light signal level is lowered because of a large loss of the dispersion compensating fiber. When the optical amplifier is used to compensate for the loss, the light output of the optical amplifier decreases and the problem of increase of the noise figure arises. In order to avoid the problem, it is necessary to arrange a separate optical amplifier.

SUMMARY OF THE INVENTION

It is an object of the present invention to provide an optical amplifier which can suppress the decrease of the light output and the increase of the noise figure without increasing the pumping light power or increasing the number of pumping light sources even when a lossy dispersion compensation unit is used.

In order to achieve the above object, in accordance with the optical amplifier of the present invention, an optical amplifying medium is divided and a wavelength multiplexing/demultiplexing unit for multiplexing or demultiplexing a pumping light and a signal light is provided in a division, and the pumping light is directly transmitted to a next stage optical amplifying medium while the signal light is transmitted to the next stage optical amplifying medium through an optical signal characteristic compensation unit such as a dispersion compensating fiber so that the reduction of the optical signal level due to the loss of the optical signal characteristic compensation unit is suppressed.

In the optical amplifier of the present invention, the signal light level is lowered by the passage through the optical signal characteristic compensation unit but it is again amplified by the next stage optical amplifying medium by using the pumping light which is not consumed by the preceding stage optical amplifying medium. In the next stage optical amplifying medium, since the input light power is low, it approaches a non-saturation state and a gain increases. As a result, it is possible to set the gain of the next stage optical amplifying medium higher than the loss of the optical signal characteristic compensation unit. By setting the gain of the preceding stage optical amplifying medium sufficiently large, the noise figure of the optical amplifier is essentially determined by the preceding stage and an effect of the loss of the inserted optical signal characteristic compensation unit to the noise figure is suppressed.

DESCRIPTION OF THE PREFERRED EMBODIMENTS

Figure 1:
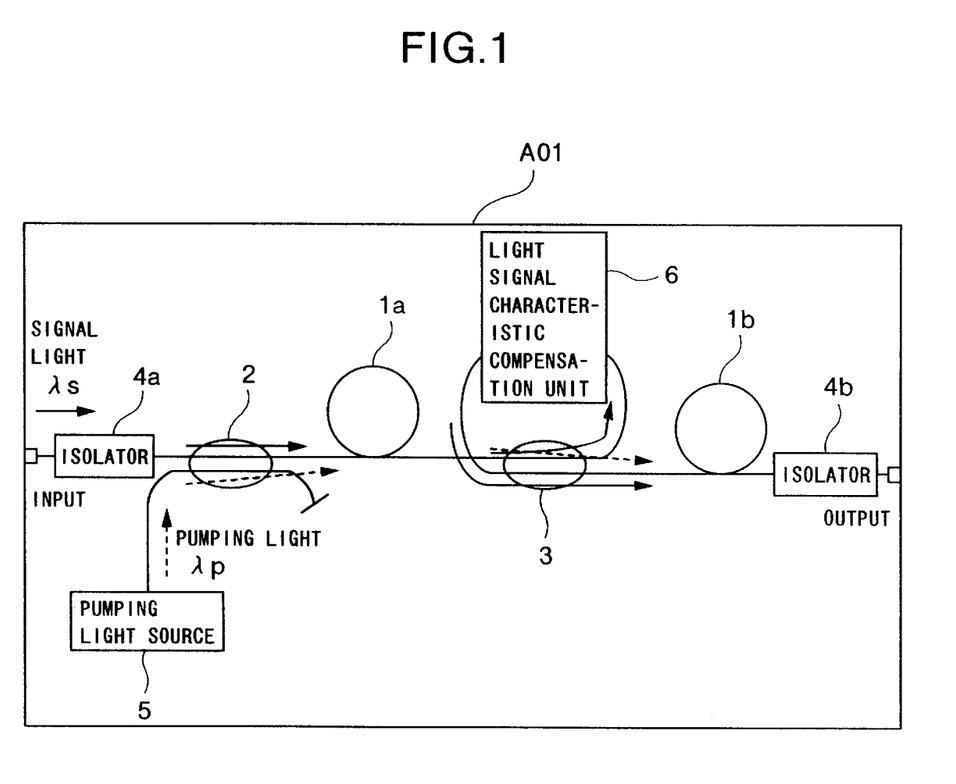
FIG. 1 shows a configuration of a first embodiment of an optical amplifier.

An embodiment of the present invention is now explained in conjunction with the accompanying drawings. FIG. 1 shows a configuration of an optical amplifier of a first embodiment of the present invention. An optical amplifier A01 comprises rare earth doped fibers 1a and 1b which are optical amplifying media, wavelength multiplexing/demultiplexing unit 2 and 3, optical isolators 4a and 4b, a pumping light source 5 and a light signal characteristic compensation unit 6. The light signal characteristic compensation unit 6 may be a high dispersion fiber having a reverse dispersion property or; an optical resonator such as ethron, which compensates for the dispersion of a transmission line optical fiber, and for a wavelength multiplexing transmission system, it may be a wavelength dependent equalizing optical filter having an optical amplifying medium gain. In FIG. 1, a signal light wavelength $\lambda s$ is shown by a solid line arrow and a pumping light wavelength λp is shown by a broken line arrow. The signal light and the pumping light are applied to the rare earth doped optical fiber 1a through the optical isolator 4a and the wavelength multiplexing/demultiplexing unit 2, and through the wavelength multiplexing/demultiplexing unit 2, respectively, so that the signal light is amplified. For a port which is not used by the wavelength multiplexing/demultiplexing unit 2, it is terminated by an oblique end of the optical fiber. The signal light then passes through the wavelength multiplexing/demultiplexing unit 3, the light signal characteristic compensation unit 6 and the wavelength multiplexing/demultiplexing unit 3 in sequence, and the pumping light is applied to a next stage rare earth doped optical fiber 1b through only the wavelength multiplexing/demultiplexing unit 3 and the signal light is again amplified. Normally, in the rare earth doped optical fiber 1b, a signal input is large because the signal light has already been amplified by the rare earth doped optical fiber 1a and it is in a gain saturation state and the gain is low. In the configuration of the present embodiment, however, since only the signal light suffers from the loss by the light signal characteristic compensation unit 6, the signal input is lowered and the rare earth doped optical fiber 1b approaches the non-saturation state and the gain rises. As a result, the loss of the light signal characteristic compensation unit 6 is compensated by the fiber 1b and the gain as viewed by the overall optical amplifier A01 is not lowered by the loss compared with non-loss state of the light signal characteristic compensation unit 6.

Figure 2:
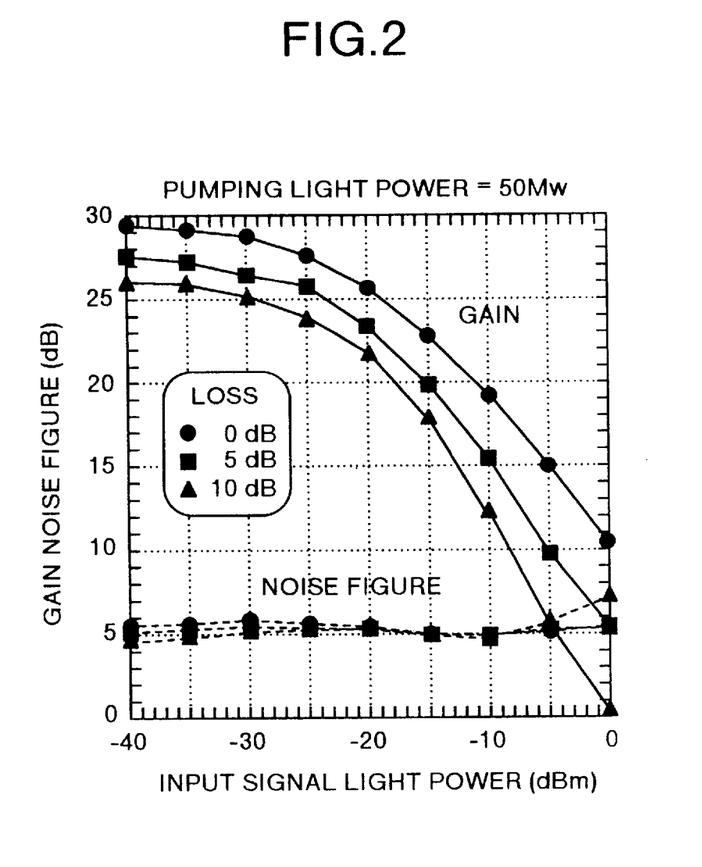
FIG. 2 illustrates an effect of the optical amplifier of the first embodiment.

Referring to FIG. 2, an effect of the first embodiment is explained. The optical amplifier of the configuration of FIG. 1 is actually constructed and a gain and a noise figure (only a beat noise component between a signal and an amplified spontaneously emitted light is considered) are actually measured with respect to an input signal light power. A signal light wavelength is 1552 nm, and a pumping light wavelength is 980 nm. In order to examine an effect of the loss of the light signal characteristic compensation unit 6, optical attenuators with losses of 5 dB and 10 dB are inserted. A mark ■ is for the loss of 5 dB by the optical attenuator, a mark ▲ is for the loss of 10 dB by the optical attenuator and a mark ● is for non-insertion of the optical attenuator (0 dB of loss). A pumping light power applied to the rare earth doped optical fiber 1a is 50 mW constant irrespective of the presence or absence of the loss. When the input signal light power is smaller than −20 dBm, the reduction of gain for the 5 dB loss is approximately 2 dB, and the reduction of gain for the 10 dB loss is approximately 4 dB, which is less than one half of the loss. On the other hand, the noise figure is substantially constant around 5 dB for the respective losses. The present experiment shows that, in the optical amplifier of the first embodiment of the present invention, the loss of the light signal characteristic compensation unit can be compensated without increasing the pumping light power. It further indicates that no significant change appears in the noise figure.

Figure 3:
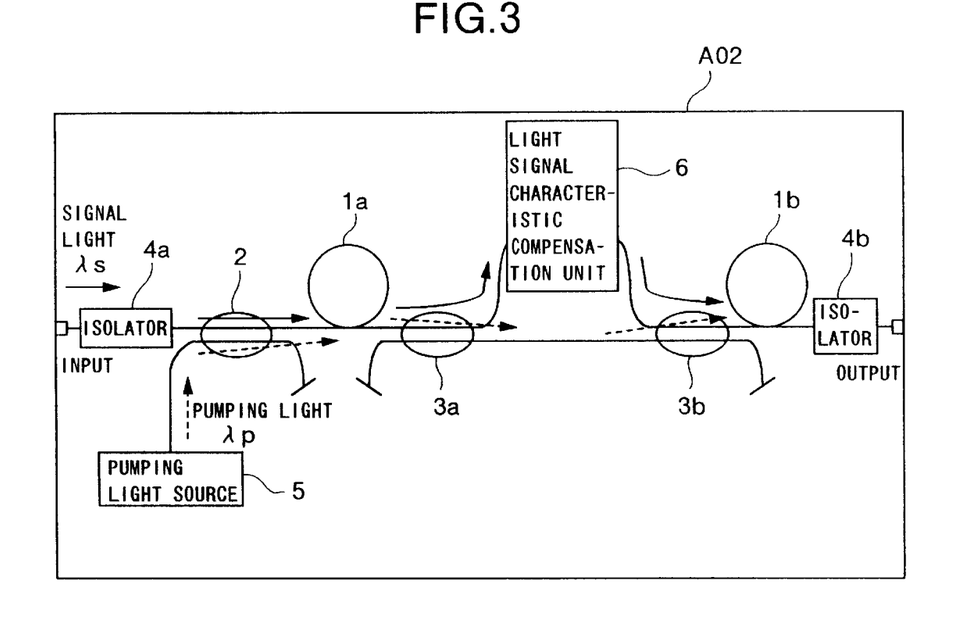
FIG. 3 shows a configuration of a second embodiment of the optical amplifier.

FIG. 3 shows a configuration of a second embodiment of the optical amplifier of the present invention. An optical amplifier A02 comprises rare earth doped optical fibers 1a and 1b which are optical amplifying media, wavelength multiplexing/demultiplexing units 2, 3a and 3b, optical isolators 4a and 4b, a pumping light source 5 and a light signal characteristic compensation unit 6. A signal light and a pumping light are applied to the rare earth doped optical fiber 1a through the optical isolator 4a and the wavelength multiplexing/demultiplexing unit 2 and through the wavelength multiplexing/demultiplexing unit 2, respectively, and the signal light is amplified. The signal light then passes through the wavelength multiplexing/demultiplexing unit 3a, the light signal characteristic compensation unit 6 and the wavelength multiplexing/demultiplexing unit 3b in sequence, and the pumping light is applied to the next stage rare earth doped optical fiber 1b through only the wavelength multiplexing/demultiplexing units 3a and 3b so that the signal light is amplified again. In the present embodiment, the same effect as that of the first embodiment is attained.

Figure 4:
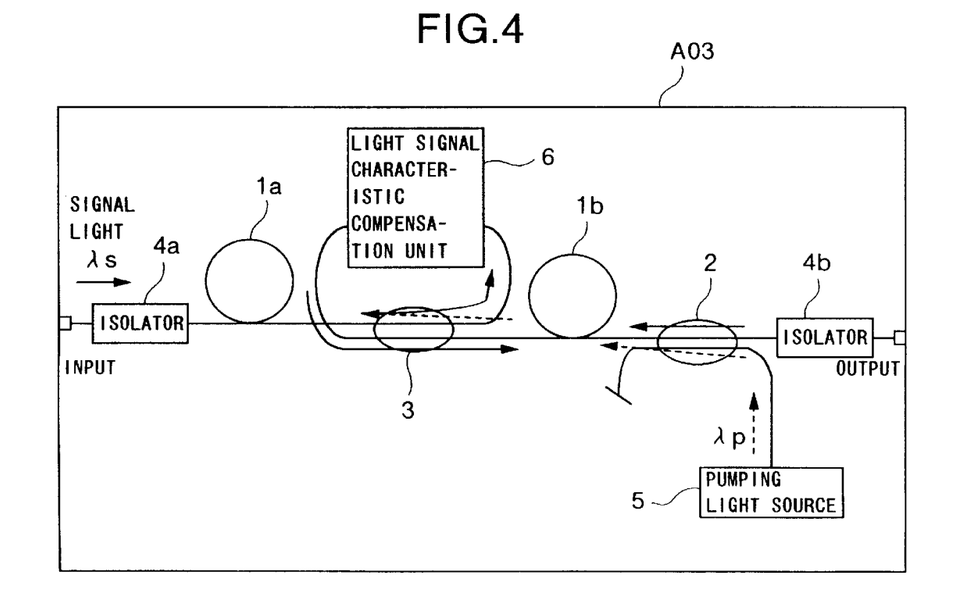
FIG. 4 shows a configuration of a third embodiment of the optical amplifier.

FIG. 4 shows a configuration of a third embodiment of the optical amplifier of the present invention. An optical amplifier A03 comprises rare earth doped optical fibers 1a and 1b which are optical amplifying media, wavelength multiplexing/demultiplexing units 2 and 3, optical isolators 4a and 4b, a pumping light source 5 and a light signal characteristic compensation unit 6. A signal light is applied to the rare earth doped optical fiber 1a through the optical isolator 4a and is amplified by the pumping light which passes through the wavelength multiplexing/demultiplexing unit 2, the rare earth doped optical fiber 1b and the wavelength multiplexing/demultiplexing unit 3 in sequence. The signal light then passes through the wavelength multiplexing/demultiplexing unit 3, the light signal characteristic compensation unit 6 and the wavelength multiplexing/demultiplexing unit 3 in sequence and is applied to the next stage rare earth doped optical fiber 1b pumped through the wavelength multiplexing/demultiplexing unit 2 so that the signal light is amplified again. In the present embodiment, the same effect as that of the first embodiment is attained.

Figure 5:
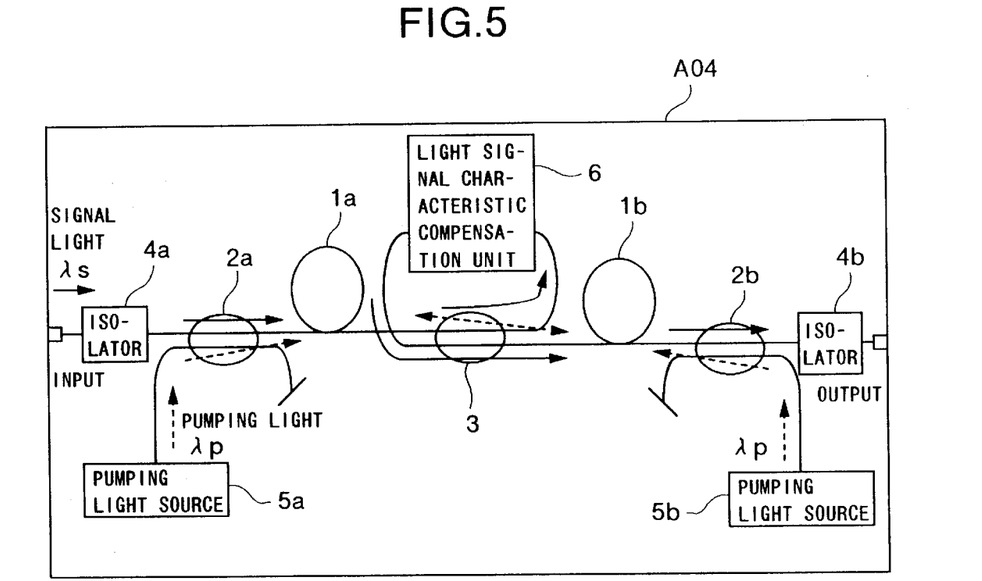
FIG. 5 shows a configuration of a fourth embodiment of the optical amplifier.

FIG. 5 shows a configuration of a fourth embodiment of the optical amplifier of the present invention. An optical amplifier A04 comprises rare earth doped optical fibers 1a and 1b which are optical amplifying media, wavelength multiplexing/demultiplexing units 2a and 2b, optical isolators 4a and 4b, pumping light sources 5a and 5b and a light signal characteristic compensation unit 6. A signal light is applied to the are earth doped optical fiber 1a through the optical isolator 4a and the wavelength multiplexing/demultiplexing unit 2a, and is amplified by a first pumping light (5a) passed through the wavelength multiplexing/demultiplexing unit 2a and a second pumping light (5b) passed through the wavelength multiplexing/demultiplexing unit 2b, the rare earth doped optical fiber 1b and the wavelength multiplexing/demultiplexing unit 3 in sequence. The signal light then passes through the wavelength multiplexing/demultiplexing unit 3, the light signal characteristic compensation unit 6 and the wavelength multiplexing/demultiplexing unit 3 in sequence, and the first pumping light and the second pumping light are applied to the next stage rare earth doped optical fiber 1b through the wavelength multiplexing/demultiplexing unit 3 and through the wavelength multiplexing/demultiplexing unit 2, respectively so that the signal light is amplified again. In the present embodiment, the same effect as that of the first embodiment is attained.

Figure 6:
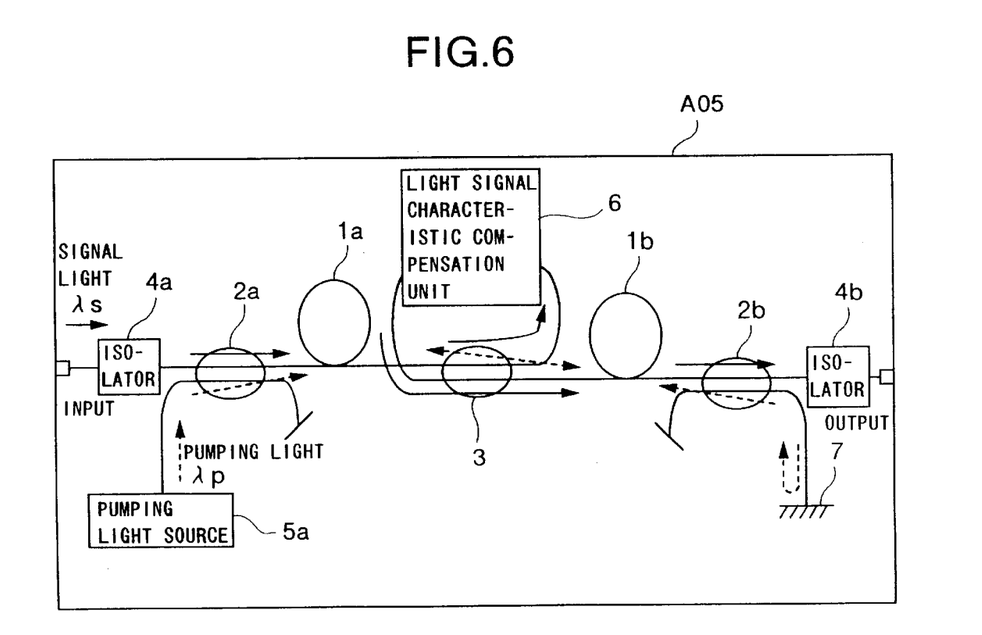
FIG. 6 shows a configuration of a fifth embodiment of the optical amplifier.

FIG. 6 shows a configuration of a fifth embodiment of the optical amplifier of the present invention. An optical amplifier A05 comprises rare earth doped optical fibers 1a and 1b which are optical amplifying media, wavelength multiplexing/demultiplexing units 2a, 2b and 3, optical isolators 4a and 4b, a pumping light source 5, a light signal characteristic compensation unit 6 and a reflection mirror 7. A signal light is applied to the rare earth doped optical fiber 1a through the optical isolator 4a and the wavelength multiplexing/demultiplexing unit 2a. A pumping light is applied to the rare earth doped optical fiber 1a through the wavelength multiplexing/demultiplexing unit 2a, and the pumping light which is not consumed in the rare earth doped optical fiber 1a passes through the wavelength multiplexing/demultiplexing unit 3, the rare earth doped optical fiber 1b and the wavelength multiplexing/demultiplexing unit 2b and is reflected by the reflection mirror 7, and passes through the same path and is directed to the rare earth doped optical fiber 1a so that the signal light is amplified. The signal light then passes through the wavelength multiplexing/demultiplexing unit 3, the light signal characteristic compensation unit 6 and the wavelength multiplexing/demultiplexing unit 3 in sequence, and the signal light and the pumping light are applied to the next stage rare earth doped optical fiber 1b through the wavelength multiplexing/demultiplexing unit 3 and through the wavelength multiplexing/ demultiplexing unit 2b, respectively so that the signal light is amplified again. In the present embodiment, the same effect as that of the first embodiment is attained. In the present embodiment, higher amplification effect is attained because the pumping light is reflected for utilization.

Figure 7:
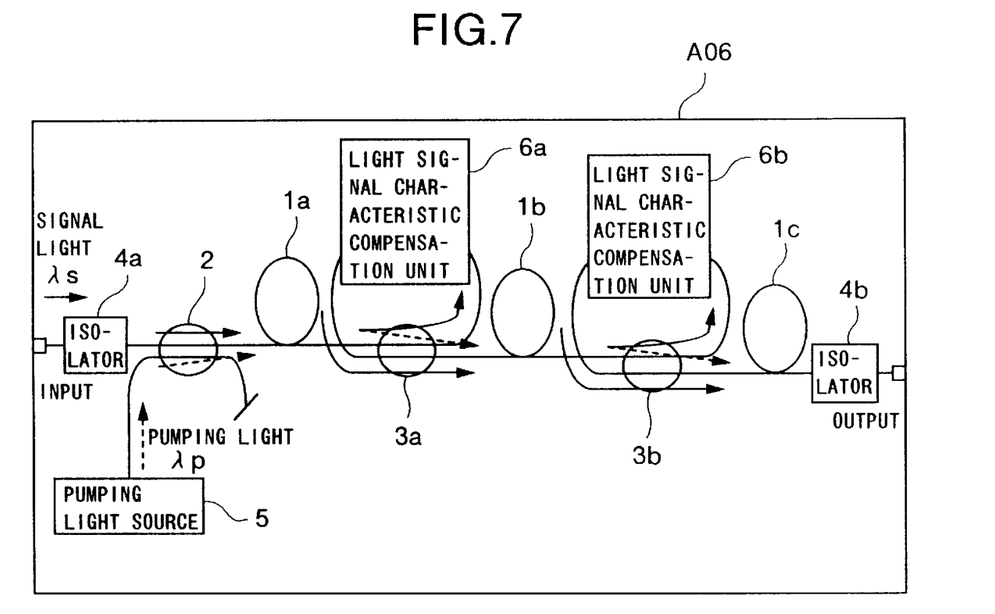
FIG. 7 shows a configuration of a sixth embodiment of the optical amplifier.

FIG. 7 shows a configuration of a sixth embodiment of the present embodiment. An optical amplifier A06 comprises rare earth doped optical fibers 1a, 1b and 1c which are optical amplifying media, wavelength multiplexing/demultiplexing units 2, 3a and 3b, optical isolators 4a and 4b, a pumping light source 5 and light signal characteristic compensation units 6a and 6b. A signal light is applied to the rare earth doped optical fiber 1a through the optical isolator 4a and the wavelength multiplexing/demultiplexing unit 2. A pumping light is applied to the rare earth doped optical fiber 1a through the wavelength multiplexing/demultiplexing unit 2 so that the signal light is amplified. The signal light then passes through the wavelength multiplexing/ demultiplexing unit 3a, the light signal characteristic compensation unit 6a and the wavelength multiplexing/demultiplexing unit in sequence, and the pumping light is applied to the rare earth doped optical fiber 1b through the wavelength multiplexing/demultiplexing unit 3a so that the signal light is amplified again. The signal light passes through the wavelength multiplexing/demultiplexing unit 3b, the light signal characteristic compensation unit 6b and the wavelength multiplexing/demultiplexing unit 3b in sequence, and the pumping light is applied to the next stage rare earth doped optical fiber 1c through the wavelength multiplexing/demultiplexing unit 3b so that the signal light is amplified again. The number of optical amplifying media need not be two but it may be three or more. In the present embodiment, the same effect as that of the first embodiment is attained. Further, in the present embodiment, a plurality of light signal compensation units may be built in the optical amplifier and a combined characteristic compensation may be attained.

Figure 8:
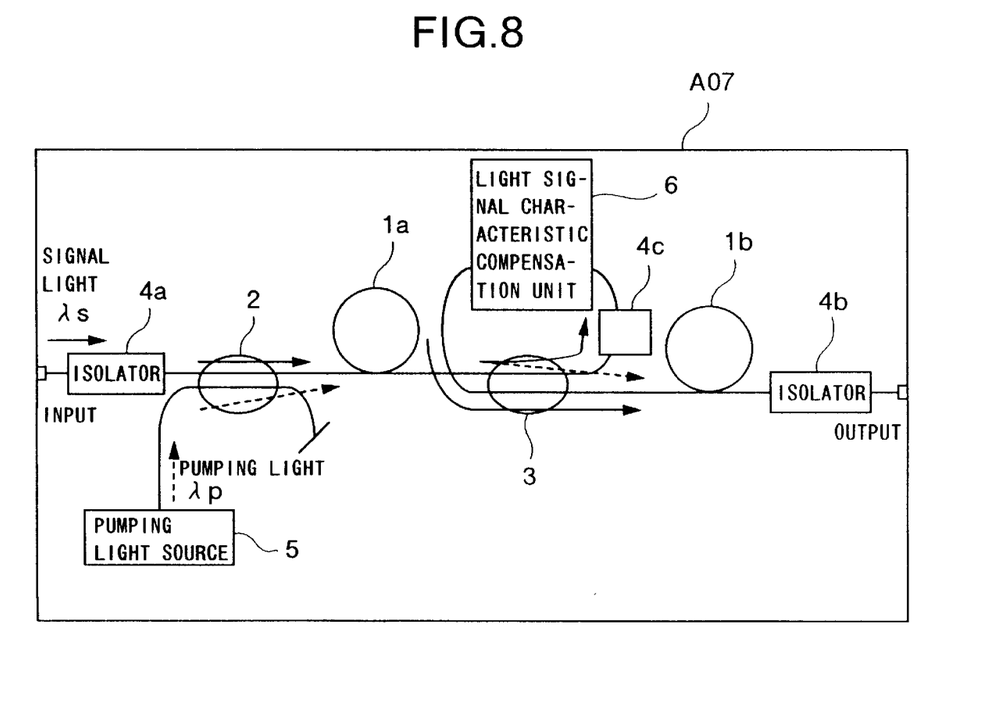
FIG. 8 shows a configuration of a seventh embodiment of the optical amplifier.
Figure 9:
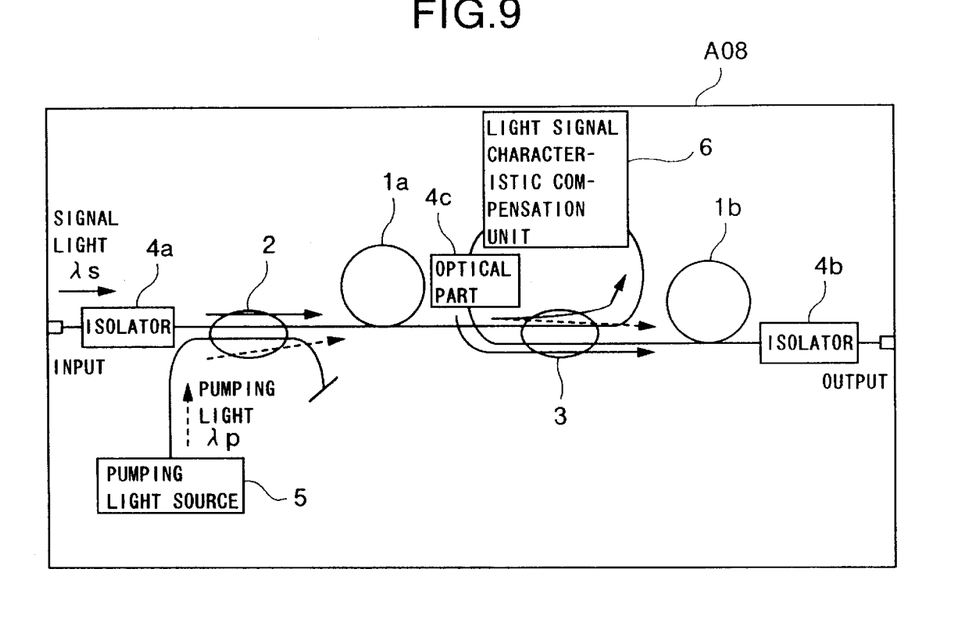
FIG. 9 shows a configuration of an eighth embodiment of the optical amplifier.
Figure 10:
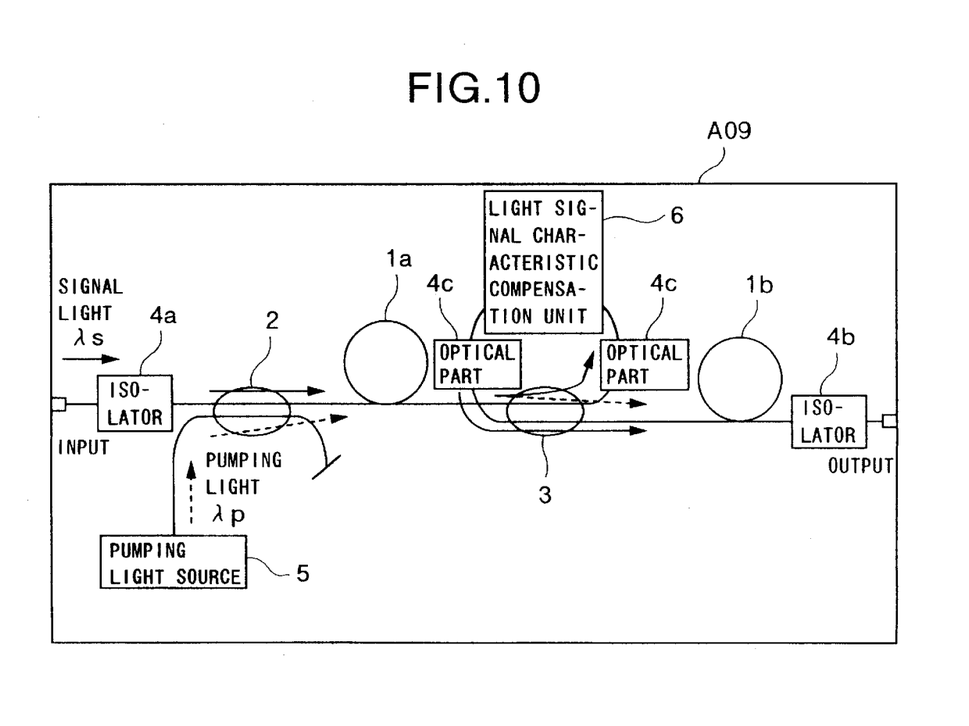
FIG. 10 shows a configuration of a ninth embodiment of the optical amplifier.

FIGS. 8~10 show configurations of seventh to ninth embodiments of the optical amplifier of the present invention. The configurations are similar to that of the first embodiment shown in FIG. 1 except that an optical part 4c is arranged in an input of the light signal characteristic compensation unit 6 (FIG. 8), an output (FIG. 9) and input/output (FIG. 10). The optical part 4c may be an optical isolator, which is explained below. The light signal characteristic compensation unit 6 may be a dispersion compensating optical fiber and a reflected light by the Rayleigh scattering of the fiber or from an optical connector is returned to the optical amplifying media so that the amplification characteristic of the light signal may be deteriorated. By inserting the optical isolator, the reflected light is suppressed. The optical isolator blocks the opposite direction spontaneous emission light travelling from the optical amplifying medium 1b to the optical amplifying medium 1a. Accordingly, a higher gain and lower noise optical amplifier is attained.

It is now assumed that the optical part 4c is an optical band-pass filter. The optical band-pass filter equalizes only the light in the vicinity of the signal light and suppresses the extra spontaneous emission and amplified light outside of the signal band to enter the next stage or preceding stage optical amplifying medium. Thus, a similar high gain and low noise optical amplifier is attained.

When the optical part 4c is a complex optical part having an optical isolator and an optical band-pass filter serially connected, the effect of the insertion of the optical isolator and the effect of the insertion of the optical band-pass filter are simultaneously attained so that a higher gain and lower noise optical amplifier is attained.

Figure 11:
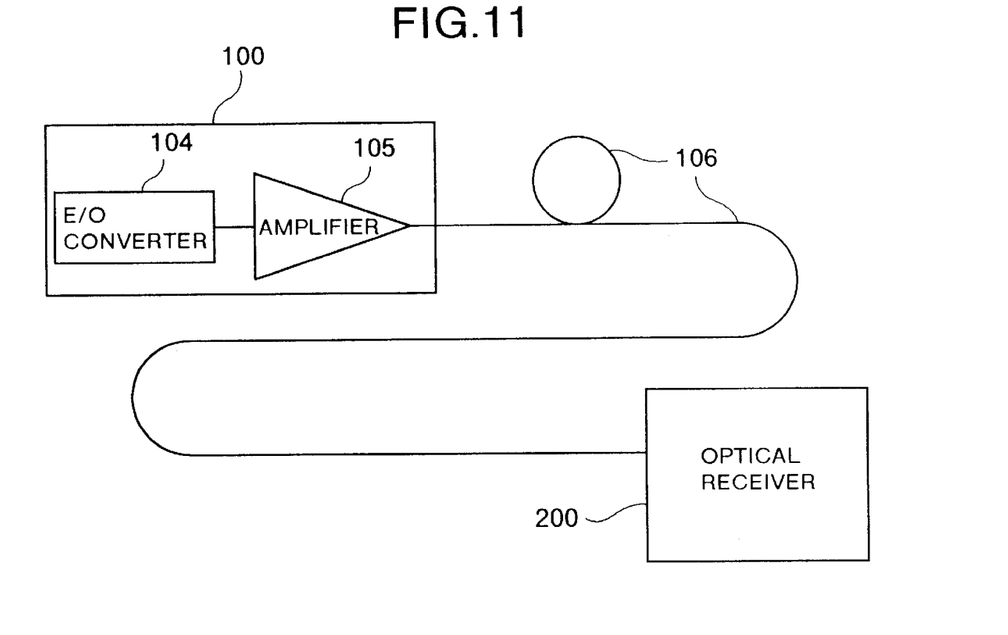
FIG. 11 shows a configuration of a first embodiment of an optical transmission system.

FIG. 11 shows a configuration of a first embodiment of an optical transmission system using the optical amplifier of the present invention. It comprises an optical transmitter 100, a transmission line optical fiber 106, and an optical receiver 200. The optical transmitter 100 comprises an electro-optical converter 104 and an optical amplifier 105 having a light signal characteristic compensation unit built therein. The optical amplifier 105 may be one of the optical amplifiers shown in the first to ninth embodiments. In accordance with the present embodiment, the optical transmission system which can suppress the deterioration of the gain of the optical amplifier or the noise characteristic due to the build-in of the light signal characteristic compensation unit in the optical transmitter is attained.

Figure 12:
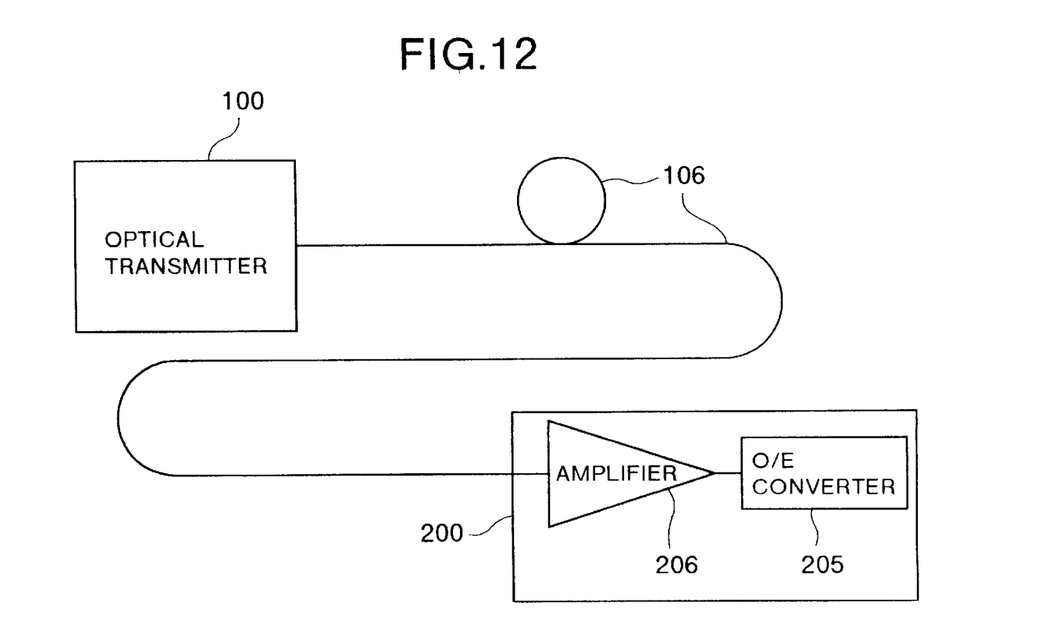
FIG. 12 shows a configuration of a second embodiment of an optical transmission system.

FIG. 12 shows a configuration of a second embodiment of the optical transmission system using the optical amplifier of the present invention. It comprises an optical amplifier 100, a transmission line optical fiber 106 and an optical receiver 200. The optical receiver 200 comprises an optical amplifier 206 having a light signal characteristic compensation unit built therein and a photo-electrical converter 205. The optical amplifier 206 may be one of the optical amplifiers shown in the first to ninth embodiments. In accordance with the present embodiment, an optical transmission system which suppresses the deterioration of the gain of the optical amplifier or the noise characteristic due to the built-in of the light signal characteristic compensation unit in the optical receiver is attained.

Figure 13:
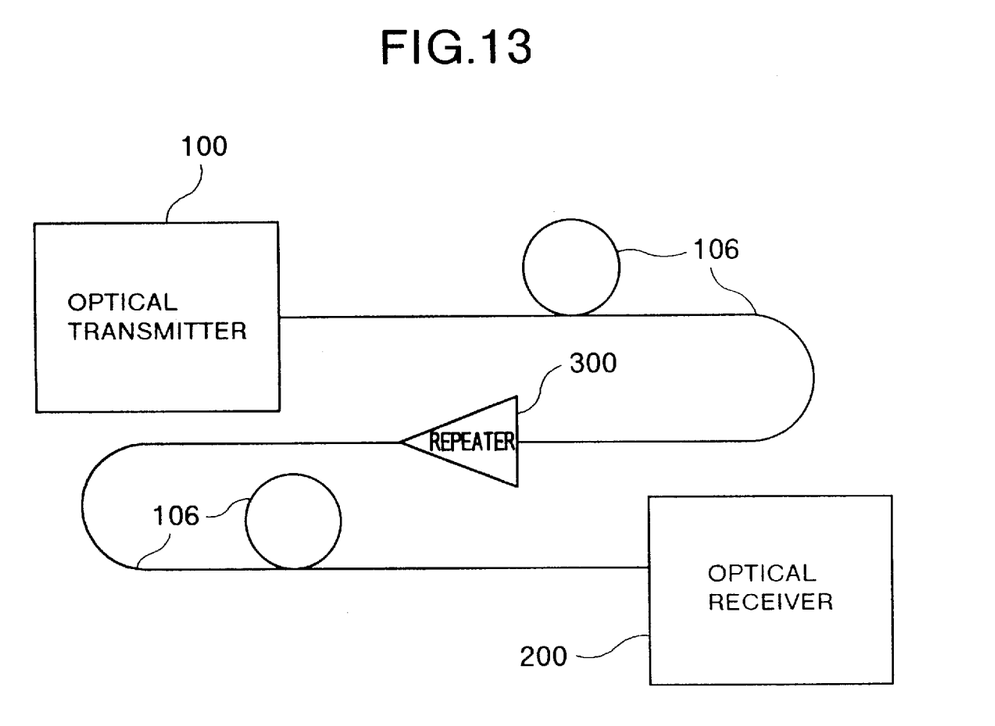
FIG. 13 shows a configuration of a third embodiment of an optical transmission system.

Fig.13 shows a configuration of a third embodiment of the optical transmission system using the optical amplifier of the present invention. It comprises an optical transmitter 100, a transmission line optical fiber 106, an optical amplifying repeater 300 and an optical receiver 200. The optical amplifying repeater 300 may be one of the optical amplifiers shown in the first to ninth embodiments. In accordance with the present embodiment, an optical transmission system which suppresses the deterioration of the gain of the optical amplifier or the noise characteristic due to the built-in of the light signal characteristic compensation unit in the optical amplifying relay is attained.

In accordance with the present invention, the optical amplifier which compensates for the loss of the light signal characteristic compensation unit and suppresses the reduction of the optical output and the increase of the noise figure without increasing the pumping light power and the number of pumping light sources is attained. Accordingly, the optical amplifier of a simple and inexpensive construction having the reduction of the gain and the increase of the noise figure suppressed is attained while adding a new function such as the dispersion compensation.

What is claimed is:

1. An optical amplifier comprising:

a first wavelength multiplexing unit for multiplexing a signal light and a pumping light from a pumping light source so as to output the signal light and the pumping light;

a first optical amplifying medium for amplifying the signal light by utilizing the pumping light and providing an output of amplified signal light;

a demultiplexing unit for receiving the amplified signal light and the pumping light and for separately outputting the amplified signal light and the pumping light;

a dispersion compensation unit for receiving the amplified signal light from the demultiplexing unit and modifying a waveform of the amplified signal light so as to compensate for waveform distortion of the signal light along a transmission path of the signal light and providing an output of a waveform modified signal light;

a second wavelength multiplexing unit for multiplexing the waveform modified signal light received from the dispersion compensation unit and the pumping light received from the demultiplexing unit without passing through the dispersion compensation unit so as to output the waveform modified signal light and the pumping light; and a second optical amplifying medium for amplifying the waveform modified signal light by utilizing the pumping light and providing an output of amplified waveform modified signal light as the signal light output of the optical amplifier;

wherein a reduction of optical signal level due to loss by the dispersion compensation unit is suppressed.

2. An optical amplifier according to claim 1, wherein the signal light includes light at plural wavelengths and the dispersion compensation unit further includes a wavelength dependent equalizing filter and providing the output of the waveform modified signal light which is wavelength equalized.

3. An optical amplifier according to claim 1, wherein the demultiplexing unit and the second wavelength multiplexing unit are combined in a single unit.

4. An optical receiver comprising:

the optical amplifier according to claim 1; and a photo-electric convertor for converting the output signal light from the optical amplifier to an electrical signal.

5. An optical transmission system comprising:

an optical transmitter for outputting a signal light;

the optical amplifier according to claim 24 for receiving the signal light from the optical transmitter; and an optical receiver for receiving the signal light from the optical amplifier.

6. An optical amplifier comprising:

a first wavelength multiplexing unit for multiplexing a signal light and a pumping light from a pumping light source so as to output the signal light and the pumping light;

a first optical amplifying medium for amplifying the signal light by utilizing the pumping light and providing an output of amplified signal light;

a demultiplexing unit for receiving the amplified signal light and the pumping light and for separately outputting the amplified signal light and the pumping light;

a dispersion compensation fiber for receiving the amplified signal light from the demultiplexing unit and modifying a waveform of the amplified signal light so as to compensate for waveform distortion of the signal light along a transmission path of the signal light and providing an output of a waveform modified signal light;

a second wavelength multiplexing unit for multiplexing the waveform modified signal light received from the dispersion compensation fiber and the pumping light received from the demultiplexing unit without passing through the dispersion compensation fiber so as to output the waveform modified signal light and the pumping light; and a second optical amplifying medium for amplifying the waveform modified signal light by utilizing the pumping light and providing an output of amplified waveform modified signal light as the signal light output of the optical amplifier wherein a reduction of optical signal level due to loss by the dispersion compensation fiber is suppressed.

7. An optical amplifier according to claim 6, wherein the signal light includes light at plural wavelengths, and further comprising a wavelength dependent equalizing filter coupled to the dispersion compensation fiber and providing an output of the waveform modified signal light which is wavelength equalized.

8. An optical amplifier according to claim 6, wherein the demultiplexing unit and the second wavelength multiplexing unit are combined in a single unit.

9. An optical receiver comprising:

the optical amplifier according to claim 6; and a photo-electric convertor for converting the output signal light from the optical amplifier to an electrical signal.

10. An optical transmission system comprising:

an optical transmitter for outputting a signal light;

the optical amplifier according to claim 6 for receiving the signal light from the optical transmitter; and an optical receiver for receiving the signal light from the optical amplifier.

11. An optical amplifier comprising:

a first wavelength multiplexing unit for multiplexing a signal light and a pumping light from a pumping light source so as to output the signal light and the pumping light;

a first optical amplifying medium for amplifying the signal light by utilizing the pumping light and providing an output of amplified signal light;

a demultiplexing unit for receiving the amplified signal light and the pumping light and for separately outputting the amplified signal light and the pumping light;

means for compensating distortion of the signal light, the distortion compensating means receiving the amplified signal light from the demultiplexing unit and modifying a waveform of the amplified signal light so as to compensate for waveform distortion of the signal light along a transmission path of the signal light and providing an output of a waveform modified signal light;

a second wavelength multiplexing unit for multiplexing the waveform modified signal light received from the distortion compensating means and the pumping light received from the demultiplexing unit without passing through the distortion compensating means so as to output the waveform modified signal light and the pumping light; and a second optical amplifying medium for amplifying the waveform modified signal light by utilizing the pumping light and providing an output of amplified waveform modified signal light as the signal light output of the optical amplifier;

wherein a reduction of optical signal level due to loss by the means for compensating distortion of the signal light is suppressed.

12. An optical amplifier according to claim 11, wherein the signal light includes light at plural wavelengths and the distortion compensating means further includes a wavelength dependent equalizing filter and providing the output of the waveform modified signal light which is wavelength equalized.

13. An optical amplifier according to claim 11, wherein the distortion compensating means includes a dispersion compensation fiber.

14. An optical amplifier according to claim 11, wherein the distortion compensating means includes an optical resonator.

15. An optical amplifier according to claim 11, wherein the optical resonator is an ethron.

16. An optical amplifier according to claim 11, wherein the demultiplexing unit and the second wavelength multiplexing unit are combined in a single unit.

17. An optical receiver comprising:

the optical amplifier according to claim 11; and a photo-electric convertor for converting the output signal light from the optical amplifier to an electrical signal.

18. An optical transmission system comprising:

an optical transmitter for outputting a signal light;

the optical amplifier according to claim 11 for receiving the signal light from the optical transmitter; and an optical receiver for receiving the signal light from the optical amplifier.

* * * * *